April 21, 1959
W. R. POLANIN
2,883,005
TREAD BRAKE ARRANGEMENT
Filed Dec. 2, 1955
4 Sheets-Sheet 1
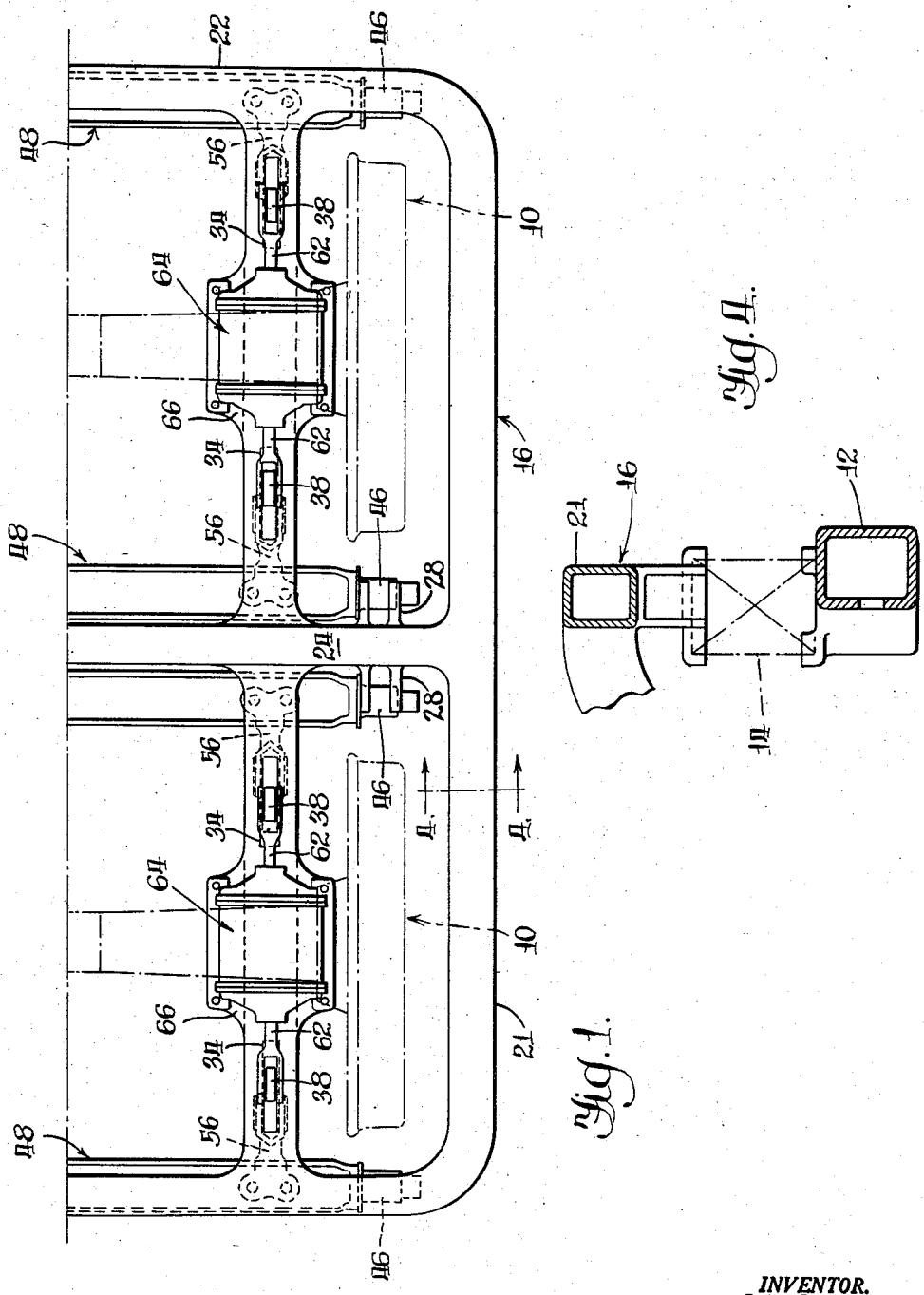
INVENTOR.
Walter R. Polanin
BY
O. B. Garner
Atty.

April 21, 1959        W. R. POLANIN        2,883,005

TREAD BRAKE ARRANGEMENT

Filed Dec. 2, 1955        4 Sheets-Sheet 2

INVENTOR.
Walter R. Polanin
BY
Orrin O. B. Garner
Atty.

April 21, 1959
W. R. POLANIN
2,883,005
TREAD BRAKE ARRANGEMENT
Filed Dec. 2, 1955
4 Sheets-Sheet 3
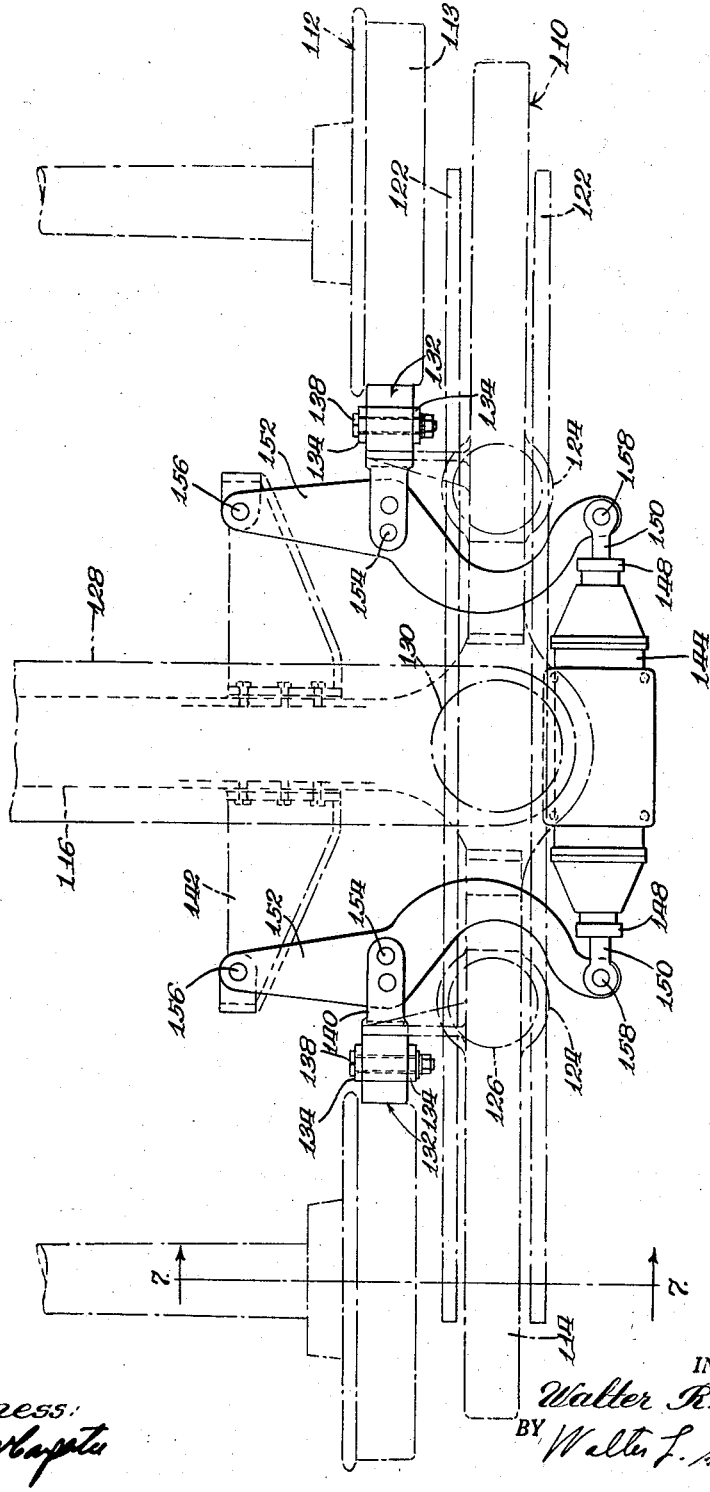
INVENTOR.
Walter R. Polanin
BY Walter L. Schlegel, Jr.
Atty.

April 21, 1959 W. R. POLANIN 2,883,005
TREAD BRAKE ARRANGEMENT
Filed Dec. 2, 1955 4 Sheets-Sheet 4
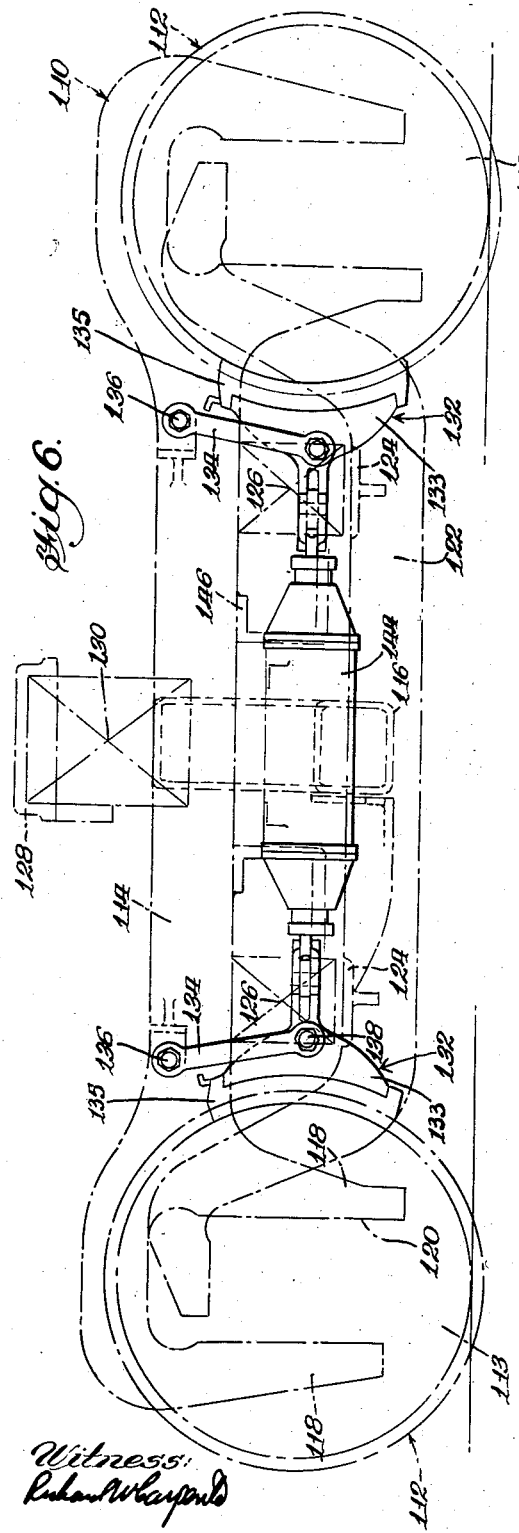
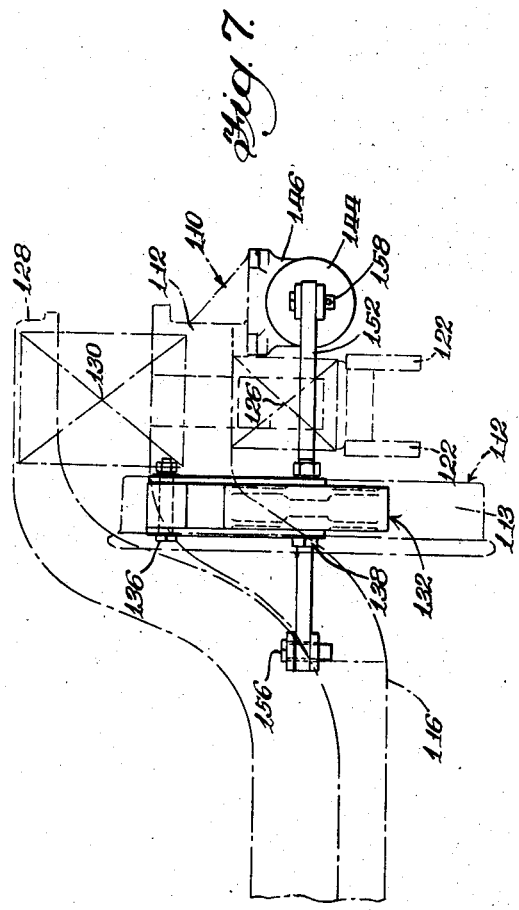
INVENTOR.
Walter R. Polanin
BY Walter L. Schlegel, Jr.
Atty.

United States Patent Office 2,883,005
Patented Apr. 21, 1959

2,883,005

TREAD BRAKE ARRANGEMENT

Walter R. Polanin, Chicago, Ill., assignor to American Steel Foundries, Chicago, Ill., a corporation of New Jersey Application December 2, 1955, Serial No. 550,585

2 Claims. (Cl. 188—53)

My invention relates to railway car truck brake arrangements and more particularly to that type of brake known in the railway art as a tread brake.

This application is a continuation in part of application, Serial No. 267,539, filed January 22, 1952, in the name of Walter R. Polanin, now abandoned.

The invention comprehends a brake arrangement wherein the outer peripheral surfaces, or treads, of railway car wheels are frictionally engaged.

A general object of this invention is the provision of a greatly simplified, highly compact brake arrangement having a minimum number of parts.

Another object of the invention is the provision of a brake arrangement having dead brake levers fulcrumed to the frame and which are pivoted directly to the brake means to insure their perfect horizontal alignment with the wheel at all times.

Another object of the invention is to provide an arrangement wherein a duplex power cylinder is directly pivoted to a pair of brake levers.

A more specific object of the invention is the provision of an arrangement wherein a duplex power cylinder is mounted on the frame and wherein a pair of brake levers are directly pivoted to the brake means and have their corresponding opposite ends pivoted to the frame and power cylinder, respectively.

These and other objects of the invention will be apparent with an examination of the following description and drawings, wherein:

Figure 1 is a plan view of the brake arrangement, only one-half of the truck being shown inasmuch as it is symmetrical about the transverse center line of the truck;

Figure 2 is a fragmentary side view of my novel arrangement;

Figure 3 is a fragmentary end view taken from the right, as seen in Figures 1 and 2;

Figure 4 is a sectional view taken at 4—4 of Figure 1, showing both frame members and illustrating the means of resiliently supporting the upper frame member, said means being well known to those skilled in the art;

Figure 5 is a view similar to Figure 1, but illustrating a modified form of my invention;

Figure 6 is a side elevational view of the structure illustrated in Figure 5;

Figure 7 is a side elevational view of the structure illustrated in Figure 5, with a portion thereof shown in section taken along line 7—7 of Figure 5.

It will be understood that certain elements have been intentionally omitted from certain views, where they have been better illustrated in certain other views.

Describing one embodiment of the invention in detail, referring first to Figures 1 through 4, the truck comprises a wheel and axle assembly generally designated 10, a lower frame member or equalizer 12 resiliently mounting an upper frame member generally designated 16, as at 14 in Figure 4. The frame member 16 also comprises pedestal jaws 18 defining journal openings 20 at the ends of said upper frame, within which openings conventional journal boxes (not shown) may be positioned in the usual manner. The upper frame member 16 comprises side rails 21 and integrally formed spaced transverse members, such as 22 and 24, said members forming the means of support for longitudinal power unit support brackets, generally designated 26.

The upper frame member 16 and more particularly transverse members 24 and 22 have integrally formed and respectively inturned and downturned brackets 28 and 30, the functions of which are hereinafter more fully described. The power support brackets 26 are of substantially rectangular cross section and comprise horizontal portions 23 and 25 interconnected by the vertically offset portion 27, said offset portion affording operational clearance during resilient movement of the upper frame member as diagrammatically illustrated by the several positions of axle 32, shown in phantom in Figure 2. The power support brackets are formed in such a manner as to afford slots 34 and pin holes 52 for the pivotal operation of dead truck levers 38 in a manner hereinafter more fully described.

At either side of each wheel and axle assembly is a friction assembly designated generally at 48, which comprises a brake beam 44 extending transversely of the truck and having generally cylindrically formed end portions, or trunnion, 46. Pivotally mounted on each trunnion 46 is brake head 40 having secured thereto a brake shoe 42 for engagement with the peripheral surface of an associated wheel. The brake assembly may be supported by a pair of hangers 50 having their lower ends pivoted to trunnion 46 and their upper ends pivoted to the brackets 30, as best seen Figure 2.

The truck levers 38 are fulcrumed on the power support bracket as at 52 and pivotally operate in the slots 34. The lower end of each truck lever 38 is pivotally connected as at 54 to the cooperating jaws 56, said jaws 56 having rigid connection to the brake beams as at 58 in Figure 3. At the upper end, the truck levers 38 are connected as by pin and slot means at 60 to the piston rods 62, said rods having jaws formed on the outboard end for complementary reception of the cooperating truck levers. The piston rods 62 form an integral part of a unit cylinder of the duplex type generally designated 64. The power cylinder 64 is conventionally mounted on a novel support plate 66 rigidly secured to power support bracket 26.

In operation the power cylinder 64 is energized moving both piston rods 62 outwardly, rotating the truck levers 38 in respectively clockwise and counterclockwise directions about fulcrum points 52. The truck levers thus actuate the brake assemblies bringing the brake assemblies into frictional contact with the periphery of the wheels.

Referring now to Figures 5 through 7 of the drawings, wherein another form of my invention is illustrated, it will be seen that in this embodiment the brake mounting and linkage arrangement has been modified in order to provide a single shoe brake, as distinguished from the clasp brake of the above described embodiment.

The truck comprises a frame indicated generally at 110, which is supported at its ends by spaced wheel and axle assemblies 112. The frame, as shown in Figure 5, comprises spaced side members, or wheel pieces, 114 (only one of which is shown) interconnected by an integrally formed transverse member, or transom, 116. The side member is provided, at each end, with a pair of depending spaced pedestal jaws 118, which form a journal opening 120 for receipt of the wheel and axle assemblies in the usual manner. The frame may be resiliently supported from the wheel and axle assemblies, as best seen in Figure 6, by means of equalizer bars 122 the ends of which are positioned on journal means (not shown). The bars present spring seats 124, on which are positioned frame supporting springs 126.

The described body itself (not shown) may be mounted in any desired manner on a bolster 128 which is supported at either end thereof from the frame by springs 130.

Referring again to Figure 6, it will be seen that the brake means comprise a pair of brake assemblies 132, positioned inwardly adjacent each wheel and comprising a brake head 133 and a brake shoe 135 engageable with the associated wheel. Support for each brake assembly is afforded by a hanger 134 having its upper end pivoted by pin 136 to the frame and being pivoted at its lower end by pin 138 to the related brake assembly. Each brake assembly is also provided with an inwardly extending lug 140.

A pair of outwardly extending support flanges 142 may be formed with, or rigidly secured to, the transom 116 inboardly of the wheels.

A power cylinder 144 is secured to the outboard side of the side member 114 centrally thereof by a mounting bracket 146. The power cylinder is preferably of the duplex type having a pair of opposed pistons 148 with outwardly extending piston rods 150 secured thereto. It will be seen that the longitudinal, or operating, axis of the power cylinder is substantially coplanar with, but normal to, the longitudinal axes of the wheel and axle assemblies. It is also substantially coplanar with the tranverse horizontal center plane of the respective brake shoe assemblies.

The brake assemblies are connected to the power cylinder by a pair of truck levers 152, which are pivoted intermediate their ends by pins 154 to brake assembly lugs 140. The inboard ends of the truck levers are fulcrumed by pins 156 to the outer extremities of transom flanges 142, and the outboard ends are pivoted by pins 158 to the respective power cylinder piston rods 150.

Thus, as will be readily seen, in operation as the power cylinder pistons move the extension rods outwardly from the center of the truck, the left and right hand actuating levers, as seen in Figure 1, are caused to rotate clockwise and counterclockwise, respectively, about fulcrum points 156 on the left and right transom flanges 142, thereby urging the respective brake assemblies into engagement with the related wheels.

Through this novel linkage arrangement, which has a minimum of parts, the power is transmitted directly to the brake shoe assemblies rather than through an involved, or complicated, linkage arrangement. The direct mounting of the brake assemblies to the truck levers insures their constant horizontal alignment with the related wheels at all times, while vertical alignment with the wheels is insured by the hangers.

I claim:
1. In a brake arrangement for a railway car truck having spaced wheel and axle assemblies, an equalizer supported thereby, spaced spring means on said equalizer at opposite sides, respectively, of the transverse vertical center plane of the truck, and a truck frame supported by said spring means; the combination of: brake means engageable with friction surfaces of respective assemblies inboardly of said spring means, brake levers having inboard ends disposed inboardly of said surfaces and fulcrumed to the frame, said levers being operatively connected to respective brake means for actuation thereof, said levers having outboard ends extending outboardly of said spring means, power means operatively connected to the outboard ends of said levers, said levers being offset toward each other intermediate their ends to define jaws receiving said spring means, and hangers pivoted at their upper ends to the frame, said hangers being pivoted at their lower ends to the respective brake means to support the weight thereof.

2. In a brake arrangement for a railway car truck having a pair of spaced wheel and axle assemblies, equalizer bars disposed on said assemblies and carried thereby outboardly of the wheels of said assemblies, resilient spring means carried by the bars between said assemblies, and a frame resiliently supported by said spring means, the combination of: a power cylinder mounted on the frame outboardly thereof and having a pair of oppositely directed pistons operative in a direction extending longitudinally of the truck, a pair of brake levers extending transversely of the truck and having their inboard ends fulcrumed to the frame inboardly of said wheels, said levers having their outboard ends connected to respective pistons, brake means carried by respective levers inboardly of said spring means and being engageable with the peripheries of respective wheels, said levers having portions offset toward each other and disposed between and receiving said spring means, brake hangers disposed on opposite sides of said brake means, said hangers having their upper ends pivoted to the frame and pivotally carrying the respective brake means at their lower ends, said power cylinder and levers being disposed substantially horizontally coplanar with the rotational axes of the assemblies.

References Cited in the file of this patent

UNITED STATES PATENTS

| | | |
|---|---|---|
| 878,181 | Barber | Feb. 4, 1908 |
| 1,145,416 | Hirsch | July 6, 1915 |
| 2,112,530 | Holloway | Mar. 29, 1938 |
| 2,131,703 | Cottrell | Sept. 27, 1938 |
| 2,169,960 | Cottrell | Aug. 15, 1939 |
| 2,215,064 | Baselt | Sept. 17, 1940 |